United States Patent
Deisinger

(10) Patent No.: US 7,264,550 B2
(45) Date of Patent: Sep. 4, 2007

(54) CONVOLUTED BOOT WITH BOOT PORTIONS POSITIONED INSIDE ONE ANOTHER

(75) Inventor: Markus Deisinger, Siegburg (DE)

(73) Assignee: GKN Driveline International GmbH (DE)

( * ) Notice: Subject to any disclaimer, the term of this patent is extended or adjusted under 35 U.S.C. 154(b) by 159 days.

(21) Appl. No.: 10/903,212

(22) Filed: Jul. 30, 2004

(65) Prior Publication Data

US 2005/0059499 A1    Mar. 17, 2005

(30) Foreign Application Priority Data

Aug. 2, 2003   (DE) ................ 103 35 551

(51) Int. Cl.
*F16D 3/84*   (2006.01)
(52) U.S. Cl. .................................... 464/175
(58) Field of Classification Search ........ 277/634–646; 464/173, 175, 11, 15, 17, 111, 146, 905, 906; 403/50, 51

See application file for complete search history.

(56) References Cited

U.S. PATENT DOCUMENTS

| | | | | |
|---|---|---|---|---|
| 901,339 A | * | 10/1908 | Grant | .......................... 403/50 |
| 3,106,077 A | * | 10/1963 | Sharp | .......................... 464/146 |
| 3,866,440 A | * | 2/1975 | Stananought | ................ 464/175 |
| 4,456,269 A | * | 6/1984 | Krude et al. | ................. 277/636 |
| 5,176,576 A | * | 1/1993 | Moulindt | ................. 277/636 X |
| 5,273,490 A | | 12/1993 | Stewart et al. | |
| 6,264,568 B1 | * | 7/2001 | Frazer et al. | ................ 464/173 |

FOREIGN PATENT DOCUMENTS

| | | |
|---|---|---|
| DE | 102 42 428 | 4/2003 |
| EP | 1 176 327 | 1/2002 |

* cited by examiner

*Primary Examiner*—Greg Binda

(57) ABSTRACT

A convoluted boot (21) for sealing an annular chamber (28) between two articulating and plunging joint parts. The boot includes a first boot portion (22) having a first collar (23) and a second collar (24), a second boot portion (25) having a third collar (26) and a fourth collar (27), wherein the second boot portion (25) is at least partially positioned inside the first boot portion (22) and wherein the third collar (26) has a smaller diameter than the first collar (23), and wherein the first collar (23) is firmly connected to the first one of the parts (12), the third collar (26) is firmly connected to the second one of the parts (15) and the fourth collar (27) is firmly and sealingly connected to the second collar (24), and the fourth collar (27) with the second collar (24) is axially displaceable relative to the second one of the parts (15).

16 Claims, 1 Drawing Sheet

CONVOLUTED BOOT WITH BOOT PORTIONS POSITIONED INSIDE ONE ANOTHER

TECHNICAL FIELD

The invention relates to a convoluted boot for sealing an annular chamber between two parts which can be articulated relative to one another and are which axially displaceable relative to one another, such as the outer joint part of a universal joint and a shaft connected to the inner joint part of the universal joint. The invention also relates to an assembly for sealing an annular chamber between two parts which can be articulated relative to one another and are which axially displaceable relative to one another by means of a convoluted boot of the type disclosed herein.

BACKGROUND OF THE INVENTION

Convoluted boots made of thermoplastic materials and elastomers are known to exist in many different forms and have been found to be successful as a means for sealing universal joints in motor vehicle applications. Whereas so-called fixed joints with a fixed joint center can only carry out angular movements between two parts, which angular movements have to be accommodated by the sealing convoluted boots under rotating conditions of articulation, the convoluted boots of plunging joints are subject to rotating articulated movements and, simultaneously, plunging movements of the joints. With the increasing plunging distances and greater operating angles of modern joints, the loads to which the respective convoluted boots are subjected also increase.

DE 102 42 428 A1 discloses a convoluted boot for constant velocity universal joints with long plunging distances, which convoluted boot comprises a first boot potion with annular folds of decreasing sizes which are intended to deform largely during angular movements between the first and the second one of the parts. A second boot portion is also included having annular folds of identical sizes which are intended to deform largely during axial plunging movements of the first and the second one of the parts relative to one another. Because the convoluted boot includes two portions each intended to serve a different purpose, it results in a relatively long axial length which may not be desirable in all vehicle applications. For example, such a boot requires a larger installation space which is not always available. The relatively long axial length has a correspondingly large surface area and thus to a large area subject to potential damage which, may lead to reduced boot or joint life. The long plunging distance is combined with a relatively great change in volume which can lead to the annular folds suffering from dents or bulges, which is also disadvantageous.

Accordingly, there exists a need for an improved convoluted boot for sealing an articulating and plunging joint assembly.

SUMMARY OF THE INVENTION

The present invention provides a convoluted boot which is able to accommodate articulation and long axial plunging distances, but at the same time has a compact design.

In particular, the present invention provides a convoluted boot having a first boot portion comprising a first collar and a second collar, a second boot portion comprising a third collar and a fourth collar, wherein the second boot portion is at least partially positioned inside the first boot portion and wherein the third collar has a smaller diameter than the first collar, and wherein the first collar is firmly connectable to the first joint part, the third collar is-firmly-connectable to the second joint part and the fourth collar is firmly and sealingly connected to the second collar and the fourth collar with the second collar being axially displaceable relative to the second joint part.

The sealing assembly in accordance with the invention thus includes two parts which can be articulated relative to one another and which are axially displaced relative to one another, and a convoluted boot of the above-mentioned type. Because a first boot portion which largely accommodates angular movements and a second boot portion which predominantly accommodates axial plunging movements are positioned inside one another, the axial length of the boot is much shorter as compared with the state of the art. Indeed, the length of the present boot essentially corresponds to the length of convoluted boots for fixed joints. A novel characteristic of the present boot is the free axial plungeability of the second and of the fourth collar relative to the second one of the parts which can be articulated and which are displaceable relative to one another. As a result of the free axial plungeability, the second collar can automatically axially adjust itself, thereby providing the lowest possible stress conditions in the convoluted boot in every angular position and in every relative axial position of the two parts relative to one another. A further advantage of the present boot is that only slight changes in volume occur in the boot interior, so that compensation deformation does not take place.

In particular embodiments, the second collar and the fourth collar can be sealingly glued to one another or vulcanised to one another or formed in one piece. The two collars can be positioned concentrically inside one another if glued or vulcanised together. The inner fourth collar can be guided on the second one of the parts in a radially clearance-free way and, more particularly, on its inside, carry sealing lips or the like relative to the second one of the parts, so that no dirt can penetrate into the region between the second boot portion and the second one of the parts. The two boot portions can also be produced independently of one another and then connected to form a uniform convoluted boot by connecting the second and the fourth boot collar. The two boot portions can be advantageously produced by blow forming, for example. If the convoluted boot is produced as an integral component, the second collar and the fourth collar form an integral unit. The shape as produced can deviate from the shape as used, i.e. after production. For example, the first boot portion and the second boot portion can be manufactured joining one another axially, and for use the first boot portion or the second boot portion can be bent over the other portion. An integral convoluted boot can be produced by injection molding for instance.

As in the case of a convoluted boot of a fixed joint, the diameter of annular folds of the first boot portion decreases from the first to the second collar. For example, there can be provided a purely linear decrease in size from fold to fold, so that the first boot portion is defined by an enveloping conical face.

The second boot portion, in one example, comprises identically-sized annular folds. This produces an enveloping cylindrical face for the second boot portion. The annular folds of the second boot portion can also be supported, on the inside, on the second one of the joint parts, with said second one of the parts, in the region of the second boot portion, commonly being provided in the form of a shaft with a constant diameter. By provided support on the shaft, it is ensured that the second boot portion cannot take part in angular movements and is thus used exclusively for compensating for changes in length. This makes it possible to produce the second boot portion with a smaller wall thickness than the first boot portion. The first boot portion is primarily subjected to an angular movement and, to a limited extent only, to an axial displacement movement between the first and the second collar.

Other advantages and features of the invention will also become apparent upon reading the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

An embodiment of the invention is illustrated in the drawing which shows half a longitudinal section of an inventive assembly between a first part and a second part of a constant velocity joint to provide a sealing effect by means of a convoluted boot:

A) in an axial central position;
B) in an axially shortened position; and
C) in an axially extended position.

DETAILED DESCRIPTION OF THE DRAWINGS

In the following description, various operating parameters and components are shown for one constructed embodiment. These specific parameters and components are included as examples and are not meant to be limiting.

Figure 1A:
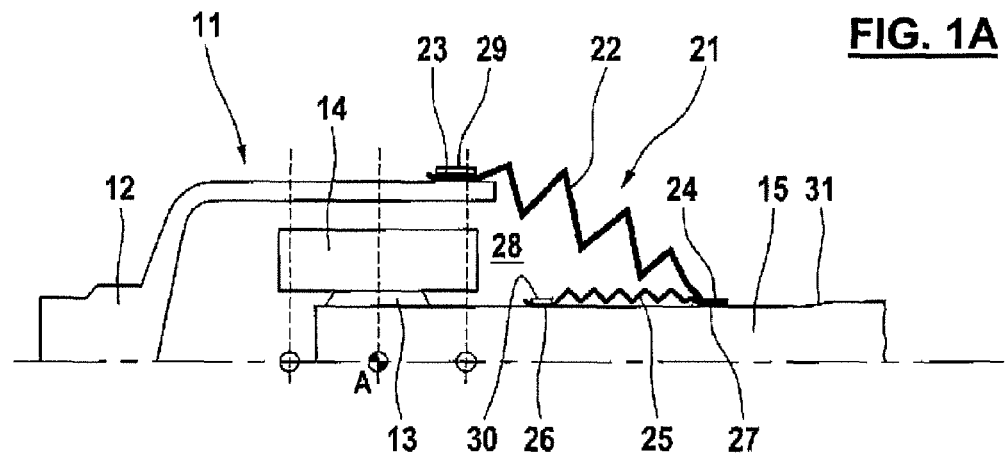
Figure 1B:
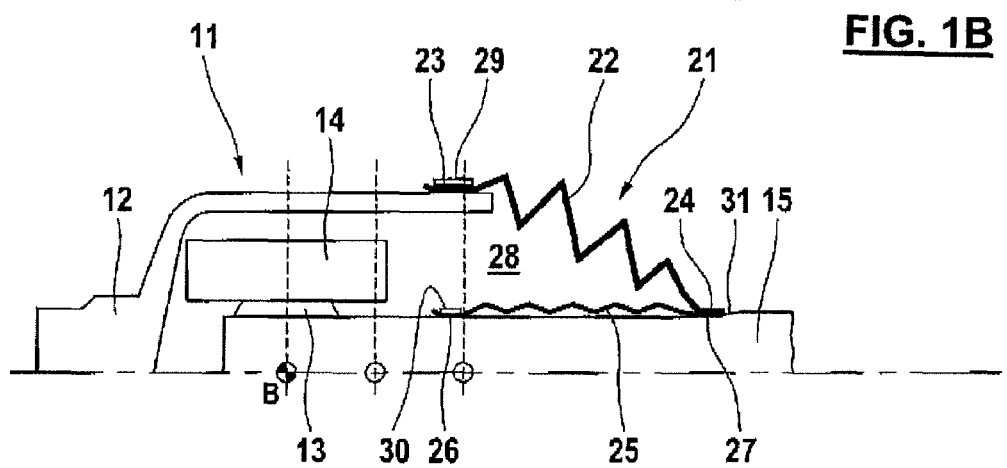
Figure 1C:
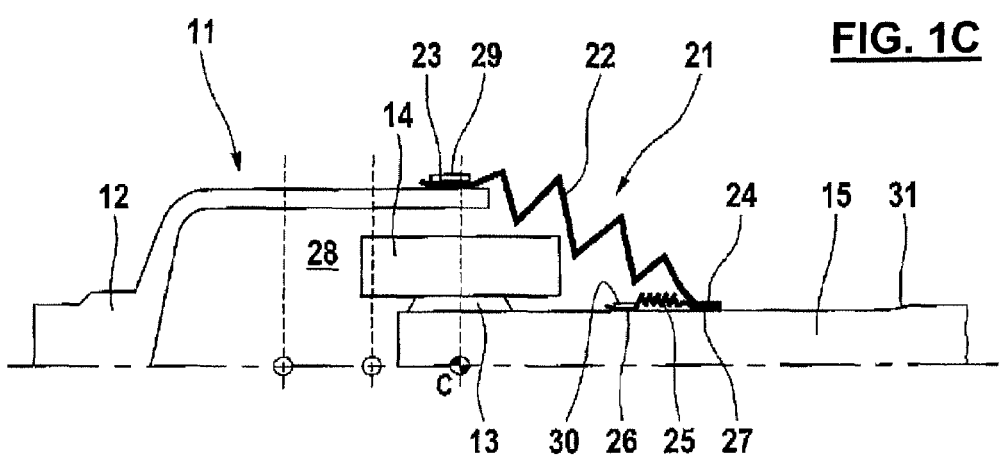

Referring now to the figures wherein like reference numerals are used to identify identical components in the various views, FIGS. 1A, 1B, and 1C show universal joint 11 in the form of a tripode joint with an outer joint part 12, an inner joint part 13 and a roller assembly 14. A shaft 15 inserted into the inner joint part 13. The outer joint part 12 forms the first one of the parts which can be articulated relative to one another and which are axially displaceable relative to one another, and the shaft 15 forms the second one of the parts which are articulatable and axially displaceable relative to one another. The annular chamber 28 which Is formed by the outer joint part 12 on the one hand and by the shaft 15 with the inner joint part 13 on the other hand is sealed by a convoluted boot 21 which is secured to the outer joint part 12 on the one hand and to the shaft 15 on the other hand. The convoluted boot 21 comprises a first boot portion 22 with a first collar 23 and a second collar 24, as well as a second boot portion 25 with a third collar 26 and a fourth collar 27. The first collar 23 is secured by means of a clamping band 29 or the like on the outer annular surface of the outer joint part 12 in an axially fixed and rotationally fast way. The third collar 26 is secured by a clamping band 30 or the like on the shaft 15 in an axially fixed and rotationally secure way. In the region of the second and fourth collars 24, 27 positioned inside one another, the two boot regions 22, 25 are firmly and sealingly connected to one another, with the inner fourth collar 27 being guided on the shaft 15 so as to be axially displaceable, but substantially sealingly in order to prevent the penetration of dirt. The diameter of the annular folds of the first boot portion 22 decreases from the first collar 23 to the second collar 24. Thus, the first boot portion 22 can be defined by a substantially conical enveloping face at the annular folds. The considerably smaller annular folds of the second boot portion 25 positioned inside the first boot portion 22 are substantially identical in size. Thus, the second boot portion 25 can be defined by a substantially cylindrical enveloping face at the annular folds. The wall thickness of the first boot portion 22 is considerably greater than the wall thickness of the second boot portion 25.

The second collar 24 and the fourth collar 27 can be formed as one integral piece. Alternatively, they can be fixed together by glue or be vulcanised to one another. The third collar 26 has a smaller diameter than the first collar 23. The second collar 24 and the fourth collar 27 have substantially the same diameter as the third collar 26 and the second, third and fourth collars 24, 26, 27 each have substantially the same inside diameter as the diameter of the shaft 15. In this example, the fourth collar 27 is guided on the shaft 15 in a radially clearance-free way. Further, there is supporting contact between the second boot portion 25 and the shaft 15.

The three illustrations each show the joint 11 in an aligned condition, i.e. it is arranged coaxially relative to the outer joint part 12 and the shaft 15. In FIG. 1A, the joint is in an axial central position, and from the joint center A, it is possible to achieve a relative displacement of the inner joint part 13 relative to the outer joint part 12 in both axial directions. The convoluted boot 21 is fitted by the clamping band 29 on the first collar 23 and by the clamping band 30 on the third collar 26 in such a way that both the first boot portion 22 and the second boot portion 25 are substantially stress-free.

In FIG. 1B, the joint center B has been displaced into the interior of the outer joint part 12, so the assembly comprising the joint 11 and the shaft 15 has been axially shortened. Whereas the shape of the dimensionally stable thick-walled outer boot portion 21 is substantially unchanged, the flexible inner boot portion 25 has been axially lengthened by pulling apart the annular folds. It can be seen that, in the process, the second collar 24 and the fourth collar 27 have been axially displaced relative to the shaft 15 as far as a stop 31 formed in the shaft 15.

In FIG. 1C, the joint center C in the outer joint part has been axially displaced towards the aperture, so that the assembly comprising the joint 11 and the shaft 15 has been axially lengthened. Again, the shape of the dimensionally stable, thick-walled first boot portion 22 remains substantially unchanged, whereas the thin-walled flexible second boot portion 25 has been considerably axially shortened as a result of the annular folds having been compressed together. The second collar 24 and the fourth collar 27 have also moved away from the stop 31 relative to the starting position on the shaft 15.

Because the second boot portion 25 is radially supported relative to the shaft 15, the axial articulation of the joint in any of the possible axial positions does not lead to any significant additional change in shape of the second boot portion. Instead, the articulating movement between the shaft 15 and the outer joint part 12 is substantially exclusively accommodated by the outer first boot portion 22. The two boot portions 22, 25 can be made of identical or different materials. Deviations in respect of the fold size, fold shape and wall thickness are possible within the limits of technical expertise and such modifications are contemplated by the present invention.

While the invention has been described in connection with several embodiments, it should be understood that the invention is not limited to those embodiments. Thus, the invention covers all alternatives, modifications, and equivalents as may be included in the spirit and scope of the appended claims.

What is claimed is:

1. A convoluted boot comprising:
   a flexible first boot portion comprising a first collar and a second collar; and
   a flexible second boot portion comprising a third collar and a fourth collar, the first and second boot portions each being convoluted portions comprising a plurality of annular folds between the respective collars such that at least the third and fourth collars are axially displaceable relative to each other, the first and second boot portions sealing an annular chamber between two parts which can be articulated relative to one another and which are axially displaceable relative to one another,
   wherein the second boot portion is positioned inside the first boot portion and wherein the third collar has a smaller diameter than the first collar,
   and wherein the first collar is firmly connectable to the first one of the parts, the third collar is firmly connectable to the second one of the parts and the fourth collar is firmly and sealingly connected to the second collar and the fourth collar with the second collar being axially displaceable relative to the second one of the parts.

2. A convoluted boot according to claim 1, wherein the second collar and the fourth collar are fixed to one another or vulcanised to one another or formed as one piece.

3. A convoluted boot comprising:
   a first boot portion comprising a first collar and a second collar; and
   a second boot portion comprising a third collar and a fourth collar, the first and second boot portions each being convoluted portions comprising a plurality of annular folds between the respective collars such that at least the third and fourth collars are axially displaceable relative to each other, the first and second boot portions sealing an annular chamber between two parts which can be articulated relative to one another and which are axially displaceable relative to one another,
   wherein the second boot portion is positioned at least partially inside the first boot portion and wherein the third collar has a smaller diameter than the first collar,
   and wherein the first collar is firmly connectable to the first one of the parts, the third collar is firmly connectable to the second one of the parts and the fourth collar is firmly and sealingly connected to the second collar and the fourth collar with the second collar being axially displaceable relative to the second one of the parts.

4. A convoluted boot according to claim 3, wherein the first boot portion annular folds decrease in size between the first and the second collar.

5. A convoluted boot according to claim 4, wherein the second boot portion is defined by a substantially cylindrical enveloping face at the annular folds.

6. A convoluted boot according to claim 3, wherein the second boot portion annular folds are substantially identical in size.

7. A convoluted boot according to claim 3, wherein the first boot portion is defined by a substantially conical enveloping face at the annular folds.

8. A sealing assembly comprising:
   a convoluted boot with a flexible first boot portion comprising a first and a second collar; and
   a flexible second boot portion comprising a third and a fourth collar, the first and second boot portions both being convoluted portions comprising a plurality of annular folds between the respective collars such that at least the third and fourth collars are axially displaceable relative to each other, the first and second boot portions sealing an annular chamber between two parts which an be articulated relative to one another and which are axially displaceable relative to one another,
   wherein the second boot portion is positioned inside the first boot portion and the third collar has a smaller diameter than the first collar and the first collar is firmly and sealingly connected to the first one of the parts, the third collar is firmly and sealingly connected to the second one of the parts and the fourth collar is firmly and sealingly connected to the second collar and the fourth collar with the second collar is arranged so as to be axially displaceable relative to the second one of the parts.

9. An assembly according to claim 8, wherein the fourth collar is guided on the second one of the parts in a radially clearance-free way.

10. An assembly according to claim 8, wherein there exists a supporting contact between the second boot portion and the second one of the parts.

11. An assembly according to claim 8, wherein the second collar and the fourth collar are fixed to one another or vulcanised to one another or formed in one piece.

12. An assembly according to claim 8, wherein the first boot portion decrease in size annular folds between the first and the second collar.

13. As assembly according to claim 12, wherein the second boot portion annular folds are substantially identical in size.

14. An assembly according to claim 12, wherein the second boot portion is defined by a substantially cylindrical enveloping face at the annular folds.

15. A sealing assembly comprising:
   a convoluted boot with a first boot portion comprising a first and a second collar; and
   a second boot portion comprising a third and a fourth collar, the first and second boot portions both being convoluted portions comprising a plurality of annular folds between the respective collars such that at least the third and fourth collars are axially displaceable relative to each other, the first and second boot portions sealing an annular chamber between two parts which can be articulated relative to one another and which are axially displaceable relative to one another,
   wherein the second boot portion is at least partially positioned inside the first boot portion and the third collar has a smaller diameter than the first collar and the first collar is firmly and sealingly connected to the first one of the parts, the third collar is firmly and sealingly connected to the second one of the parts and the fourth collar is firmly and sealingly connected to the second collar and the fourth collar with the second collar is arranged so as to be axially displaceable relative to the second one of the parts.

16. An assembly according to claim 15, wherein the first boot portion is defined by a substantially conical enveloping face at the annular folds.

* * * * *

UNITED STATES PATENT AND TRADEMARK OFFICE
CERTIFICATE OF CORRECTION

PATENT NO. : 7,264,550 B2
APPLICATION NO. : 10/903212
DATED : September 4, 2007
INVENTOR(S) : Markus Deisinger It is certified that error appears in the above-identified patent and that said Letters Patent is hereby corrected as shown below:

In Claim:

In Claim 8, column 6, line 7, please change "which an" to "which can"

In Claim 13, column 6, line 33, please change "As" to "An"

Signed and Sealed this

Tenth Day of March, 2009

JOHN DOLL
*Acting Director of the United States Patent and Trademark Office*